(12) United States Patent
Ramanan et al.

(10) Patent No.: US 11,031,614 B2
(45) Date of Patent: Jun. 8, 2021

(54) METHOD OF EQUALIZING THE PRESSURE DROP OF FUEL CELL COLUMNS

(71) Applicant: BLOOM ENERGY CORPORATION, Sunnyvale, CA (US)

(72) Inventors: Natarajan Ramanan, San Jose, CA (US); Martin Perry, Mountain View, CA (US); Yashas Keshav, San Jose, CA (US); Michael Petrucha, Santa Clara, CA (US); Nilanjana Basu, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 178 days.

(21) Appl. No.: 16/202,492

(22) Filed: Nov. 28, 2018

(65) Prior Publication Data

US 2020/0168932 A1  May 28, 2020

(51) Int. Cl.
*H01M 8/04746* (2016.01)
*H01M 8/04089* (2016.01)
*H01M 8/0438* (2016.01)

(52) U.S. Cl.
CPC ..... *H01M 8/04753* (2013.01); *H01M 8/0438* (2013.01); *H01M 8/04104* (2013.01); *H01M 8/04783* (2013.01); *H01M 8/04432* (2013.01); *H01M 8/04761* (2013.01)

(58) Field of Classification Search
CPC ......... H01M 8/04753; H01M 8/04783; H01M 8/04104; H01M 8/0438; H01M 8/04761; H01M 8/04432
See application file for complete search history.

(56) References Cited

U.S. PATENT DOCUMENTS

| 6,103,409 | A | * | 8/2000 | DiPierno Bosco ......................... H01M 8/04089 429/446 |
|---|---|---|---|---|
| 8,785,074 | B2 | | 7/2014 | Edmonston et al. |
| 8,877,399 | B2 | | 11/2014 | Weingaertner et al. |
| 8,968,943 | B2 | | 3/2015 | Perry et al. |
| 2004/0202907 | A1 | * | 10/2004 | Chapman .............. H01M 8/241 429/535 |
| 2005/0218361 | A1 | * | 10/2005 | Shajii .................. F16K 31/0675 251/129.04 |
| 2006/0204826 | A1 | | 9/2006 | Borchers |
| 2007/0196704 | A1 | | 8/2007 | Valensa et al. |
| 2016/0226093 | A1 | | 8/2016 | Edmonston et al. |

* cited by examiner

*Primary Examiner* — Ula C Ruddock
*Assistant Examiner* — Matthew W Van Oudenaren
(74) *Attorney, Agent, or Firm* — The Marbury Law Group PLLC (57) ABSTRACT

A fuel cell system includes a plurality of fuel cell stacks or columns, each fuel cell stack or column containing a plurality of fuel cells, and at least one pressure drop tool located in a fuel path of at least one first fuel cell stack or column but not in a fuel path of at least one second fuel cell stack or column.

5 Claims, 6 Drawing Sheets

METHOD OF EQUALIZING THE PRESSURE DROP OF FUEL CELL COLUMNS

FIELD

The present invention is generally directed to fuel cell stacks and columns and specifically to equalizing the pressure drop in different fuel cell columns.

BACKGROUND

Figure 1:
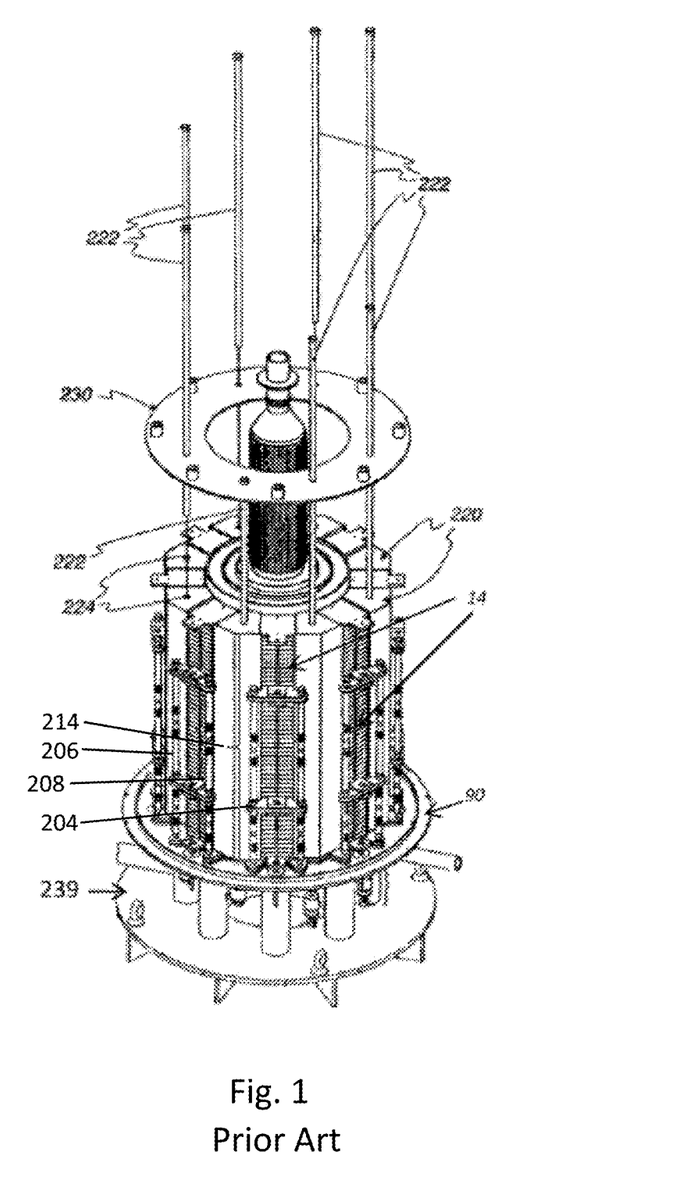
FIG. 1 is a schematic illustration of a prior art fuel cell system.

U.S. application Ser. No. 11/656,563, filed on Jan. 23, 2007 and published as US published application 2007/0196704 A1 and incorporated herein by reference in its entirety, describes a fuel cell system in which the solid oxide fuel cell (SOFC) stacks 14 are located on a base 239, as shown in FIG. 1. A fuel cell stack includes a stack of fuel cells separated by interconnects. Wedge shaped ceramic side baffles 220 (e.g., having a non-uniform thickness and a roughly triangular cross sectional shape in the horizontal direction) are located between adjacent fuel cell stacks 14 (or columns 214 of fuel cell stacks 14). Each column 214 may contain 1-10 stacks 14, such as 4-6 stacks. The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically nonconductive and made as one unitary piece from a suitable ceramic material. FIG. 1 also shows fuel distribution manifolds 204 between the stacks 14 in the stack column 214 and fuel inlet 216 and exhaust 208 conduits connected to the manifolds 204.

In this prior art system, the SOFC stacks 14 maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222. The bores or feed throughs 224 through the baffles 220 act as heat sinks and thereby decrease the system efficiency.

In an alternative embodiment, the load is transmitted through the base 239 as this is the only zero datum of the system. Penetrations or feed-throughs through the base 239 are used in order to pull the required load from the base 239.

SUMMARY

An embodiment is drawn to a method of matching the pressure drop of a plurality of fuel cell stacks or columns in a fuel cell system including measuring or estimating a pressure drop in each stack or column of the plurality of stacks or columns, determining if a difference in pressure drops between any of the stacks or columns is greater than a threshold value and if the difference in the pressure drop is greater than the threshold value, providing at least one pressure drop tool in a fuel path that stacks or columns having a lower pressure drop, the at least one pressure drop tool increasing the pressure drop of the stack or column having the lower pressure drop such that the difference in pressure drop between the stacks or columns in the fuel cell system is less than the threshold.

Another embodiment is drawn to a fuel cell system including a plurality of fuel cell stacks or columns, each fuel cell stack or column comprising a plurality of fuel cells and at least one pressure drop tool located in a fuel path of at least one first stack or column but not in a fuel path of at least one second stack or column.

Another embodiment is drawn to a method of operating a fuel cell system comprising passing fuel through a pressure drop tool in a fuel cell path of a first stack or column but not passing the fuel through the pressure drop tool of a second stack or column in the same hot box.

DETAILED DESCRIPTION

A hot box for a fuel cell system may include up to 8 columns of fuel cells. Preferably all the stacks and columns in the hot box have substantially the same pressure drop, such as 5% or less differences between the respective columns and stacks, when in operation.

However, fabricating a SOFC system with matching pressure drops across multiple stacks or columns of fuel cells is complicated. Specifically, the cross sectional area of fuel cell riser openings in interconnects used to separate adjacent fuel cells typically vary in cross sectional area due to tool wear in the manufacturing process of the interconnects. This variation in cross sectional area leads to a variation in pressure drop from stack to stack (or column to column) when operated in the fuel cell system.

Typically, a large inventory of interconnects segregated by cross sectional area is maintained to aid in fabrication of the stacks. However, this results in high inventory costs. Further, if a hot box fails in a failure in time (FIT) test or a hot box comes back from the field and requires replacement of one or more stacks or columns, finding matching stacks or columns is a challenge. By using the pressure drop tool, random stacks or columns could be taken out of inventory and used to make or repair to a random fuel cell stack or column. The ability to select random fuel cells stacks makes the kitting process simpler and also reduces inventory and speeds up stack build times.

An embodiment includes a method of matching the pressure drops of a plurality of fuel cell stacks or columns, such as solid oxide fuel cell stacks or columns, in a fuel cell system during operation. In an embodiment, the pressure drop of individual fuel cell stacks or columns are measured or estimated from modeling data. In an embodiment, the pressure drop is determined or estimated at gas flows corresponding to operation in a given current range. Preferably all of the stacks or columns have a pressure drop within a desired threshold, such as within 10%, such as within 5%, of each other.

However, often the difference in the pressure drop of one or more of the stacks or columns in a fuel cell system is more than the desired threshold. This is especially true, when the fuel cell system uses 4 or more, such as 5, 6, 7 or 8 fuel cell columns, each containing 1 to 10 stacks.

If the difference in the pressure drops of one or more of the stacks or columns is more than the desired threshold, at least one pressure drop tool is provided in the fuel path of those stacks or columns which have the lower pressure drop. The pressure drop tool inhibits the flow of gas (fuel and/or oxidizer) and thereby increases the pressure drop of the stack or column. In this manner the difference in pressure drop between the stacks or columns is decreased such that it is less than the threshold.

In an embodiment, prior to stack assembly, the interconnects in the stack are segregated and stored based on the cross sectional area of the fuel riser openings in the interconnects. Once a stack is assembled, the expected pressure drop can be estimated from a) modeling data for the interconnects and the fuel manifold and/or b) measurement of the pressure drop of the stack in a test fixture. In an embodiment, pressure drop estimates are made for all of the stacks or columns in the same hot box for a fuel cell system. After all of the pressure drops are estimated, the highest pressure drop can be identified as well as the lowest pressure drop, thereby determining the range of pressure drops for the fuel cell stacks or columns in the fuel cell system. If the difference between the highest pressure drop and the lowest pressure drop is greater than a desired threshold, a pressure drop tool can be added to the fuel path of the stack or column with the lowest pressure drop, thereby increasing the pressure drop through the stack or column with the lowest pressure drop. The difference in pressure drop between the highest pressure drop stack or column and the next lowest pressure drop stack or column is then determined. If the difference in pressure drop is greater than the desired threshold, a pressure drop tool can be added to the fuel path of the stack or column with the next lowest pressure drop. The process is repeated until all of the fuel cell stacks and columns in the fuel cell system are within a desired range, such as within 5%.

Figure 2A:
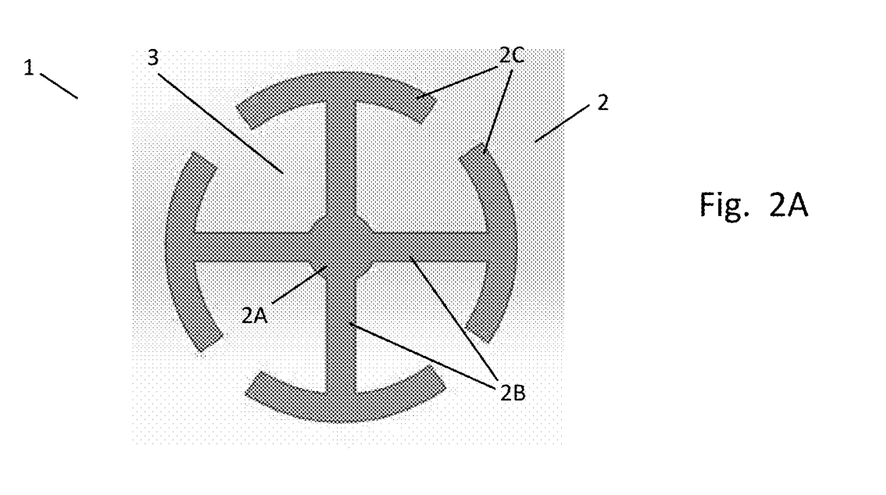
FIGS. 2A and 2B are schematic illustrations of a pressure drop tool according to embodiments.
Figure 2B:
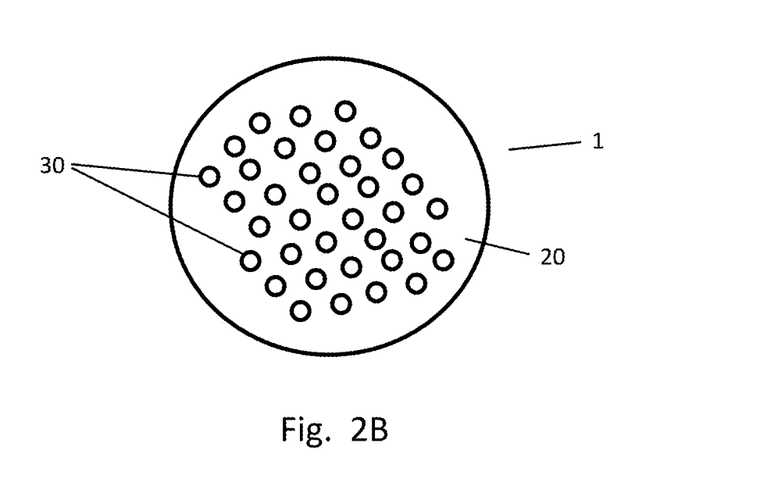

The pressure drop tools may be, for example, a porous plug or a plate with holes. An embodiment of a pressure drop tool 1 is illustrated in FIG. 2A. In this embodiment, the pressure drop tool 1 is a metal (e.g. Inconel) plate 2 which includes multiple perforations 3. For example, the plate 2 may include a hub portion 2A in the middle and plural spokes 2B, such as 2-8 spokes, e.g., 4 spokes radiating away from the hub portion 2A. Each spoke 2B may be connected to the same or different circumferential portion 2C. Each circumferential portion 2C has a curved outer surface which matches an interface surface of a fuel cell inlet conduit 206 or fuel exhaust conduit 208. The radius and circumference of the plate 2 are configured to fit into and be removed from the fuel inlet conduit 206 or exhaust conduit 208 by friction. The perforations 3 are located between the spokes 2B, and optionally between the circumferential portions 2C. Alternatively, there are no perforations 3 between the circumferential portions 2C, e.g. a single ring shaped circumferential portion 2C surrounds all the spokes 2B. In an alternative embodiment shown in FIG. 2B, the pressure drop tool 1 comprises a porous cylinder 20 made of a porous material or containing channels or openings 30 therethrough. Any other suitable shapes for the pressure drop tool one may be used.

In an embodiment, the pressure drop tools 1 are fabricated to cause discrete pressure drops at a designed gas flow. In an embodiment, more than one pressure drop tool 1 may be added to the fuel path. For example, if each pressure drop tool is configured to provide a discrete pressure drop amount "X", then two pressure drop tools 1 can be added to the fuel path of the lowest pressure drop stack or column to increase its pressure drop by "2X", and so on.

In an embodiment, the pressure drop is measured at the end of a conditioning process in which the fuel cell stacks or columns are heated to reflow the seals located between adjacent fuel cell stack elements (e.g., between fuel cells and adjacent interconnects), as described in U.S. Pat. No. 9,065,127, hereby incorporated by reference in its entirety. The pressure drop is measured with pressure transducers located across the fuel flow inlet and exhaust conduits 206, 208. In some cases, the interface seals are not fully set, rendering the pressure drop measurement less than ideal. In these cases, modeling results may be used to estimate the pressure drop and to determine if one or more pressure drop tools 1 should be added to one or more conduits 206, 208.

Figure 3:
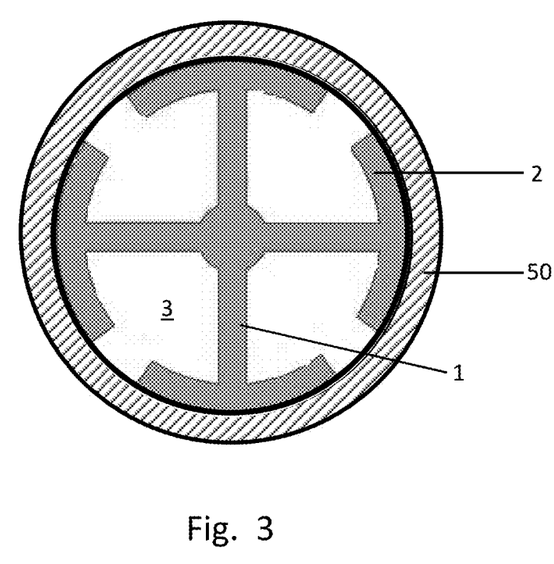
FIG. 3 is a top view of a pressure drop tool located in a fuel conduit according to an embodiment.

FIG. 3 illustrates a top view of a pressure drop tool 1 inserted and retained by friction into a fuel cell conduit 50, which may be a fuel cell inlet or fuel cell exhaust conduit 206, 208. Alternatively or in addition, the pressure drop tool 1 can be inserted into air conduits.

Figure 4:
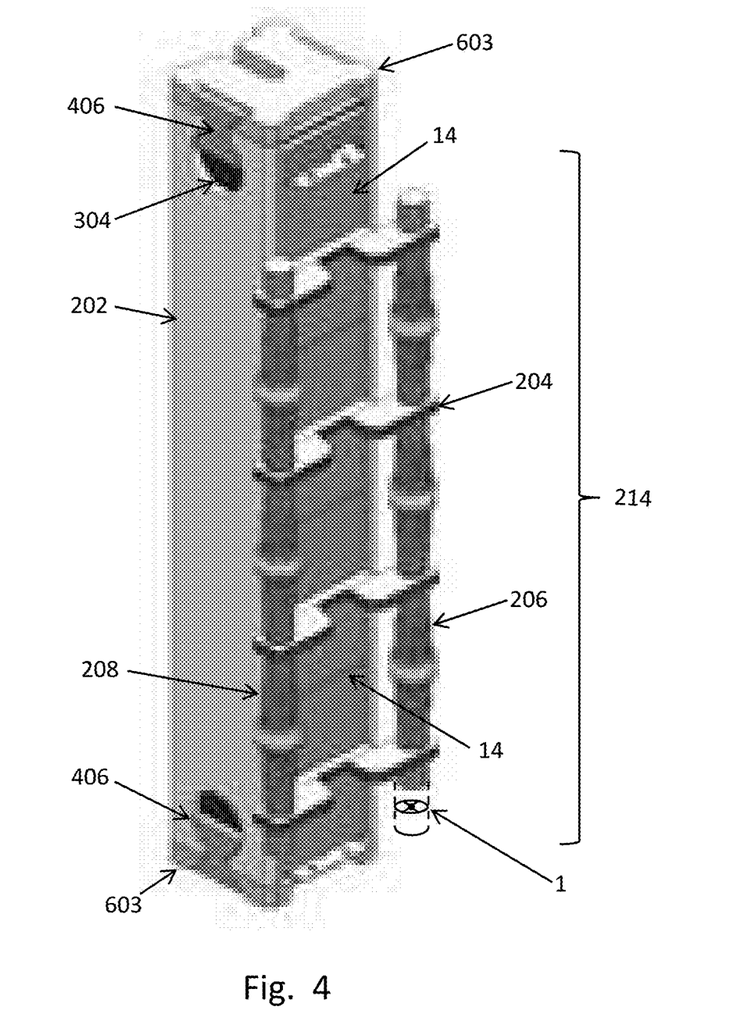
FIG. 4 is a three dimensional view of a fuel cell column according to an embodiment.

A fuel cell column 214 which is externally manifolded for air and internally manifolded for fuel is illustrated in FIG. 4. The column 214 contains 8 fuel cell stacks 14 with intervening fuel manifolds 204. The fuel cell column 214 includes baffle plates 202 on the sides of the fuel cell stacks 14 in the column 214. The baffle plates 202 are connected to top and bottom block 603 via bow tie shaped ceramic inserts 406. The inserts 406 preferably comprise plate shaped inserts having a narrower middle portion and two wider end or dovetail portions. The end portions may be rounded (i.e., a dog bone type bow tie shaped inserts). The end portions of the bow tie shaped inserts 406 are fitted into corresponding circular or quasi-circular cutouts 304 in the baffle plates 202. In this embodiment, the ceramic plate shaped baffle plates 202 may include one or more cutouts 304 on opposite sides of the baffle plate 202. In an embodiment, the end portions of the inserts completely or partially fill the cutouts. The inserts 406 may comprise the same material (e.g., alumina or ceramic matrix composite) or a different material from the material of the baffle plates 202.

As described above, the fuel manifolds 204 are located between adjacent stacks 14 in the column 214. The manifolds 204 distribute fuel to and from the stacks 14. The fuel is provided to the manifolds 204 via fuel cell inlet conduit (e.g., pipe) 206, and removed from the manifolds 204 via a fuel exhaust conduit (e.g., pipe) 208.

In one embodiment, the pressure drop tool 1 is inserted into a fuel conduit 50 shown in FIG. 3. The fuel conduit 50 can be one or both of the fuel inlet conduit 206 and/or the fuel exhaust conduit 208 shown in FIG. 4, such as the fuel inlet conduit 206, as shown in the cut-away view in the lower right side of FIG. 4. Alternatively or in addition, the fuel conduit may comprise one more fuel inlet pipes 21 and/or one or more fuel exhaust pipes 23A of an anode hub structure 600, shown in FIG. 6A.

Figure 5:
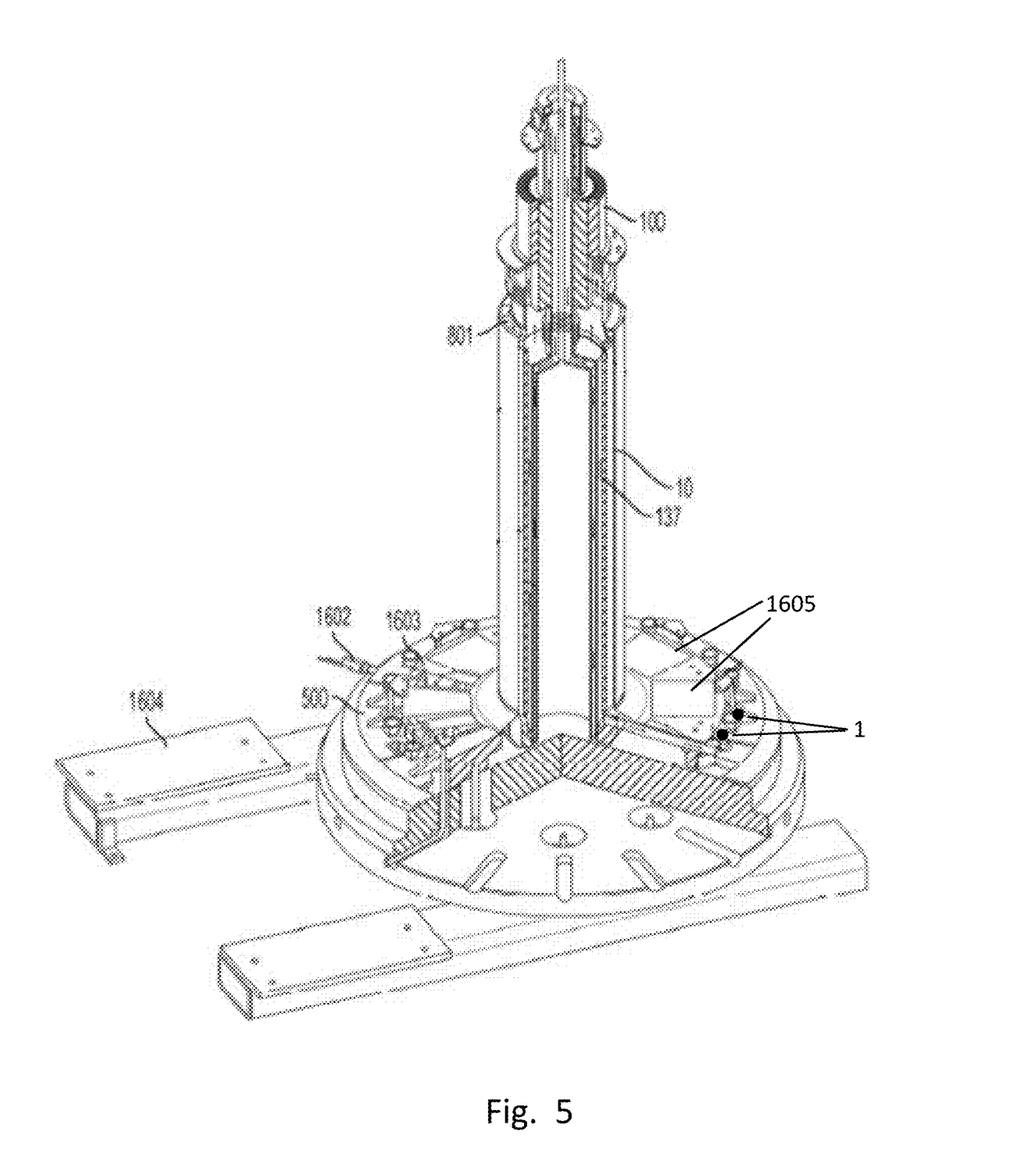
FIG. 5 is a three dimensional cut-away view of an anode flow structure according to an embodiment.

FIG. 5 illustrates the anode flow structure according to one embodiment of the invention. The anode flow structure includes a cylindrical anode recuperator (also referred to as a fuel heat exchanger)/pre-reformer 137, an anode cooler (also referred to as an air pre-heater) heat exchanger 100 mounted over the anode recuperator, and an anode tail gas oxidizer (ATO) 10 as described in U.S. Pat. No. 8,968,943, hereby incorporated by reference in its entirety. In this embodiment, the anode flow structure includes a pressure drop tool 1 in a fuel conduit. The pressure drop tool 1 may be, for example, a porous plug or a plate with holes in it, as described above. In an embodiment, the pressure drop tool 1 may located in one or more fuel inlet pipes 21, one or more fuel exhaust pipes 23A or both one or more fuel inlet pipes 21 and one or more fuel exhaust pipes 23A of an anode hub structure 600, shown in FIG. 6A.

The anode hub structure 600 is positioned under the anode recuperator 137 and ATO 10 and over the hot box base 500. The anode hub structure is covered by an ATO skirt 1603. A combined ATO mixer/fuel exhaust splitter 801 is located over the anode recuperator 137 and ATO 10 and below the anode cooler 100. An ATO glow plug 1602, which aids the oxidation of the stack fuel exhaust in the ATO, may be located near the bottom of the ATO. Also illustrated in FIG. 5 is a lift base 1604 which is located under the fuel cell system. In an embodiment, the lift base 1604 includes two hollow arms with which the forks of a fork truck can be inserted to lift and move the fuel cell unit, such as to remove the fuel cell unit from a cabinet (not shown) for repair or servicing. The fuel cell columns 214 of FIG. 4 are position on the pedestals 1605 shown in FIG. 5.

Figures 6A, 6B:
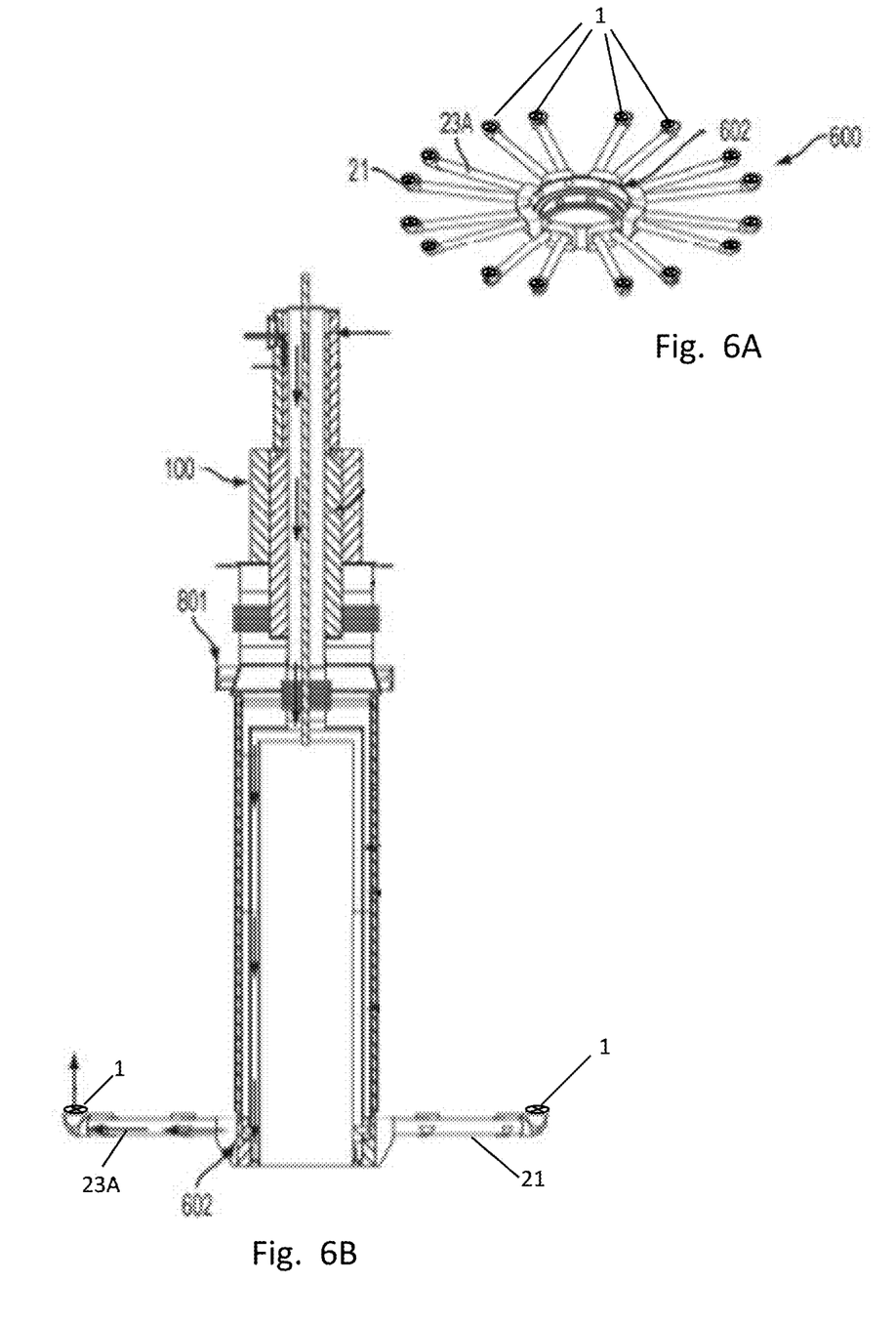
FIG. 6A is a three dimensional view of an anode hub flow structure according to an embodiment.
FIG. 6B is a side cross sectional view of the anode hub flow structure of FIG. 6A.

FIG. 6A illustrates an anode flow hub structure 600 according to an embodiment. The hub structure 600 is used to distribute fuel evenly from the anode recuperator to plural fuel cell stacks and columns 214. The anode flow hub structure 600 includes a grooved cast base 602 and a "spider" hub of fuel inlet pipes 21 and exhaust pipes 23A. Each pair of pipes 21, 23A connects to one of the plurality of columns 214 shown in FIG. 4. Anode side cylinders (e.g., anode recuperator 137 inner and outer cylinders and ATO outer cylinder 10A) are then welded or brazed into the grooves in the base 602 creating a uniform volume cross section for flow distribution, as shown in FIG. 6B. The "spider" fuel pipes 21, 23A run from the anode flow hub 600 out to the columns where they are welded to vertical fuel inlet conduits 206 and exhaust conduits 208. The pressure drop tools 1 may be inserted into top parts of the pipes 21 and/or 23A as shown in FIGS. 6A and 6B.

A method of matching the pressure drop of a plurality of fuel cell stacks or columns in a fuel cell system including measuring or estimating a pressure drop in each stack of the plurality of stacks or columns, determining if a difference in pressure drops between any of the stacks or columns is greater than a threshold value and if the difference in the pressure drop is greater than the threshold value, providing at least one pressure drop tool in a fuel path that stacks or columns having a lower pressure drop, the at least one pressure drop tool increasing the pressure drop of the stack or column having the lower pressure drop such that the difference in pressure drop between the stacks or columns in the fuel cell system is less than the threshold.

In an embodiment, the at least one pressure drop tool causes a predetermined pressure drop. In an embodiment, after adding the at least one pressure drop tool, a variation in pressure drop among the plurality of stacks or columns is 5% or less during operation of the fuel cell system. In an embodiment, the pressure drop tool is a porous plug or a plate with holes. In an embodiment, the method further comprises providing a plurality of pressure drop tools into the fuel path. In an embodiment, estimating the pressure drop comprises employing modeling data. In an embodiment, providing the pressure drop tool comprises inserting the pressure drop tool into a fuel conduit 50 of the fuel cell stack 14 or column 214.

An embodiment is drawn to a fuel cell system including a plurality of fuel cell stacks or columns, each fuel cell stack or column comprising a plurality of fuel cells and at least one pressure drop tool located in a fuel path of at least one first stack or column but not in a fuel path of at least one second stack or column.

In an embodiment, the pressure drop tool is a porous plug or a plate with holes. In an embodiment, a pressure drop of the first fuel cell stack or column without the pressure drop tool is more than 5% greater than a pressure drop of the respective second fuel cell stack or column, and a variation in pressure drop between the first and the second fuel cell stacks or columns is 5% or less when the pressure drop tool is located in the fuel path of the first fuel cell stack or column.

In an embodiment, the pressure drop tool is located in a fuel conduit of the first stack or column. In an embodiment, the pressure drop tool 1 is located in a fuel inlet conduit 206 or in a fuel exhaust conduit 208 connected to fuel manifolds 204 located between the fuel cell stacks 14 in the first fuel cell column 214. In an embodiment, the pressure drop tool 1 is located in fuel inlet pipes 21 or in fuel exhaust pipes 23A of an anode hub assembly 600 located below the first fuel cell column 214. In an embodiment, the pressure drop tool 1 comprises a central hub 2A, a plurality of spokes 2B radiating outward from the central hub 2A and a plurality of circumferential portions 2C, wherein each spoke 2B contacts a respective circumferential portion 2C located at an end of the spoke 2B distal from the central hub 2A.

An embodiment is drawn to a method of operating a fuel cell system comprising passing fuel through a pressure drop tool in a fuel cell path of a first stack or column but not passing the fuel through the pressure drop tool of a second stack or column in the same hot box.

In an embodiment, the pressure drop tool is a porous plug or a plate with holes. In an embodiment, a pressure drop of the first fuel cell stack or column without the pressure drop tool is more than 5% greater than a pressure drop of the respective second fuel cell stack or column, and a variation in pressure drop between the first and the second fuel cell stacks or columns is 5% or less when the pressure drop tool is located in the fuel path of the first fuel cell stack or column.

In an embodiment, the pressure drop tool is located in a fuel conduit of the first fuel cell stack or column. In an embodiment, the pressure drop tool is located in a fuel inlet conduit or in a fuel exhaust conduit connected to fuel manifolds located between the fuel cell stacks in the first fuel cell column. In an embodiment, the pressure drop tool is located in fuel inlet pipes or in fuel exhaust pipes of an anode hub assembly located below the first fuel cell column.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of matching the pressure drop of solid oxide fuel cell stacks or columns in a fuel cell system comprising:
   measuring or estimating a pressure drop in each fuel cell stack or column;
   determining if a difference in pressure drops between any of the fuel cell stacks or columns is greater than a threshold value; and
   if the difference in the pressure drop is greater than the threshold value, inserting a pressure drop tool inside a gas conduit of one of the fuel cell stacks or columns that has a lowest pressure drop, the pressure drop tool increasing the pressure drop of the fuel cell stack or column having the lowest pressure drop such that the difference in pressure drop between the fuel cell stacks or columns is less than the threshold value, wherein the pressure drop tool is a porous plug or plate with holes which is retained inside the gas conduit by friction, such that the pressure drop tool provides a fixed amount of flow restriction at a designated gas flow rate.

2. The method of claim 1, wherein after inserting the pressure drop tool, a variation in pressure drop among the fuel cell stacks or columns is 5% or less during operation of the fuel cell system.

3. The method of claim 1, further comprising inserting a plurality of pressure drop tools into the gas conduit, such that a gas flowing through the gas conduit sequentially flows through the inserted pressure drop tools.

4. The method of claim 1, wherein estimating the pressure drop comprises employing modeling data.

5. The method of claim 1, wherein the gas conduit is a fuel conduit of the fuel cell stack or column.

* * * * *